United States Patent [19]
LaFollette et al.

[11] Patent Number: 6,145,018
[45] Date of Patent: *Nov. 7, 2000

[54] METHOD FOR HINDERING SOME TYPES OF NODES FROM BECOMING A BUS ARBITRATION CONTROLLER

[75] Inventors: David W. LaFollette, Sunnyvale; Jerrold V. Hauck, Fremont, both of Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/977,460

[22] Filed: Nov. 24, 1997

[51] Int. Cl.[7] ............................ G06F 13/006; G06F 17/60
[52] U.S. Cl. ................ 710/8; 710/10; 709/221; 709/227
[58] Field of Search ............................ 710/8, 9, 10, 14, 710/20, 25, 38; 709/221, 227, 249, 250, 252

[56] References Cited

U.S. PATENT DOCUMENTS

| 5,394,556 | 2/1995 | Oprescu | 395/800 |
| 5,630,173 | 5/1997 | Oprescu | 395/860 |
| 5,784,557 | 7/1998 | Oprescu | 395/200.5 |
| 5,802,289 | 9/1998 | Oprescu | 395/200.19 |
| 5,875,301 | 2/1999 | Duckwall et al. | 395/200.51 |

*Primary Examiner*—Ayaz R. Sheikh
*Assistant Examiner*—Tim Vo
*Attorney, Agent, or Firm*—Blakely, Sokoloff, Taylor & Zafman LLP

[57] ABSTRACT

A method for hindering a first type of node from becoming an arbitration controller during a tree identification process is described. The method includes sending a first request from a first node to a second node. The response to the first request is delayed by establishing a parent-child relationship between a third node and the second node, the second and third nodes being the first type of node. A response is then sent, establishing the second node as the child of the first node. Afterward, the first node is designated as the bus arbitration controller.

32 Claims, 7 Drawing Sheets

METHOD FOR HINDERING SOME TYPES OF NODES FROM BECOMING A BUS ARBITRATION CONTROLLER

BACKGROUND OF THE INVENTION

1. Field of the Invention

The invention relates in general to the field of digital systems and, more particularly, to buses used with digital systems. Specifically, the invention relates to a bus protocol for preventing a specific type of node from becoming a bus arbitration controller.

2. Description of the Related Art

FIG. 1 illustrates a bus 100 to which a processor 105, digital camera 110, monitor 115, and mouse 120 are connected. Digital signals may be applied to the bus 100 and routed to any of the previously mentioned devices. If the digital camera 110 needs to send a signal to the monitor 115, the digital camera 110 has to gain access to the bus 100. Generally, one of the devices attached to the bus 100 is designated as the bus arbitration controller and controls when signals are applied to the bus 100. In this example, the processor 105 has been designated as the bus arbitration controller.

For the digital camera 110 to gain access to the bus 100, the digital camera 110 must send a bus control request to the processor 105. The bus control request essentially involves "asking" permission to be the device that applies a signal to the bus 100. One skilled in the art will appreciate that a signal applied to the bus may be a packet of digital information (e.g., data). The processor 105 decides if access will be granted to the digital camera 110. Arbitration of the bus 100 becomes necessary in order to minimize the likelihood of simultaneous or overlapping signals being applied to the bus 100.

Assuming that the processor 105, as the bus arbitration controller, allows the digital camera 110 access to the bus 100, the digital camera 110 will send a header along with the signal to indicate the signal is for the monitor 115. When the monitor 115 receives the signal, it will respond quickly by sending an acknowledgment to the digital camera 110. The digital camera 110 would accept the acknowledgment, and that would be the end of the digital camera's cycle as the bus master.

FIG. 2 illustrates a more detailed view of the four previously mentioned devices that are connected to the bus 100. Each of the devices has a link logic circuit 200 and a physical logic circuit 205. The physical logic circuit 205 receives the bus signals from the link logic circuit 200 and provides switching signals to be applied to the bus 100. A node is generally defined as having both a physical and link logic circuit and at least one associated device (e.g., the processor 105).

For a device to be designated as the bus arbitration controller, the nodes associated with each device generally have some structure. The structuring of a bus is generally referred to as bus configuration in the art. The bus configuration process includes identifying all of the nodes connected to the bus, which is often initiated when devices are added/removed from the bus. When the nodes have been connected, a bus "tree" is formed, after which the nodes on the bus are numbered. Finally, bus arbitration is controlled by the designated node.

The nodal "trees" generally consist of multiple branches and a root. The node at the top of the tree is often designated as the root node, and the device associated with that node is designated as the bus arbitration controller. All of the branches of the nodal tree have at least one connection to the root node and do not form a loop. One skilled in the art will appreciate that for a nodal tree to be formed, there has to be a "tree" identification process in which the relationship of the nodes are decided and the root node is designated.

FIG. 3A illustrates six nodes 310–324 that are associated with five devices (not shown). All of the nodes in FIG. 3A are connected to only one other node except nodes 310 and 320. Since the nodes 310 and 320 are connected to multiple nodes, the remaining nodes 312, 314, 322, 324 immediately initiate the tree identification process by sending parent-notify requests to the only other node to which they are connected. For example, the nodes 312, 314 send parent-notify requests to node 310. The node 310 may agree to be the "parent" of the nodes 312, 314 and respond by sending child-notify responses to each of those nodes. A parent node is generally responsible for sending arbitration requests up toward the root node and sending access grants and denials down to its children nodes.

Simultaneously, the node 320 may send child-notify responses to the nodes 322, 324 after they have sent their individual parent-notify requests. When the nodes 310, 320 have accounted for all of their nodes except one, they send parent-notify requests to each other. Bus contention occurs when two nodes simultaneously send a parent-notify request to each other. The contention is generally resolved by having each of the nodes wait a randomly selected period of time. There are generally only two time periods that a node can wait, one of which is shorter than the other. After the nodes 310, 320 wait a selected period of time, they resend their parent-notify requests to each other.

If contention reoccurs, the nodes wait another randomly selected period of time. Otherwise, the first node to send the parent-notify request causes a child-notify response to be sent by the other node which is then designated as the root node. For example if the node 320 sends a parent-notify request before the node 310 sends a parent-notify request, the node 310 responds by sending a child-notify response to the node 320 and agrees to be the root node. In this example, FIG. 3B illustrates the tree configuration for the previous example cited. As shown, the node 320 has two child nodes, which are the nodes 322, 324. The node 310 has three child nodes corresponding to the nodes 320, 312, 314.

One skilled in the art will appreciate that if the node 324 wants to send some information to the node 314, it would first have to send a bus control request to the node 320, which forwards the request to the root node 310. If the root node 310 sends back a response granting the node 324 control of the bus, the node 324 sends the information to the node 320, who forwards it to the nodes 322, 310. The node 322 ignores the information since it does not have its identifier in the header, and the node 310 forwards the information to the nodes 312, 314. Similarly, the node 312 disregards the information, while the node 314 sends back an acknowledgment to indicate that the information has been received. The acknowledgment is sent to the node 310, which forwards it to the nodes 312, 320. The node 320 forwards the response to the nodes 322, 324. The node 324 receives the acknowledgment and relinquishes control of the bus. In the previous bus configuration process described, any node may become the root node.

For a node to be a root node, some additional logic features should be included in the physical logic circuit to provide effective arbitration of the bus. The root node may also need to have circuitry by which the passage of signals on the bus may be synchronized with some devices (e.g., a system clock). Since root nodes generally need additional logic, it becomes beneficial to have some of the less complex nodes connected to the bus whose physical logic circuit does not have all of the additional circuitry needed for root nodes. When these subphysical logic circuits are used to make subphysical (sub) nodes, the cost and time factors may be reduced. By allowing an undesirable node to become the root node, additional time is often spent by causing the bus to reset so a different node can become root.

Because the subphysical nodes contain less circuitry than the "regular" physical nodes, it would be best not to have a subphysical node become the root node. Thus, it would be beneficial to have a tree identification process that prevents subphysical nodes from becoming the bus arbitration controller.

SUMMARY OF THE INVENTION

The invention relates to a method for hindering a first type of node from becoming an arbitration controller during a tree identification process. The method includes sending a first request from a first node to a second node. The response to the first request is delayed by establishing a parent-child relationship between a third node and the second node, the second and third nodes being the first type of node. A response is then sent, establishing the second node as the child of the first node. Afterward, the first node is designated as the bus arbitration controller.

BRIEF DESCRIPTION OF THE DRAWINGS

Other objects and advantages of the invention will become apparent upon reading the following detailed description and upon reference to the drawings in which.

Figure 1:
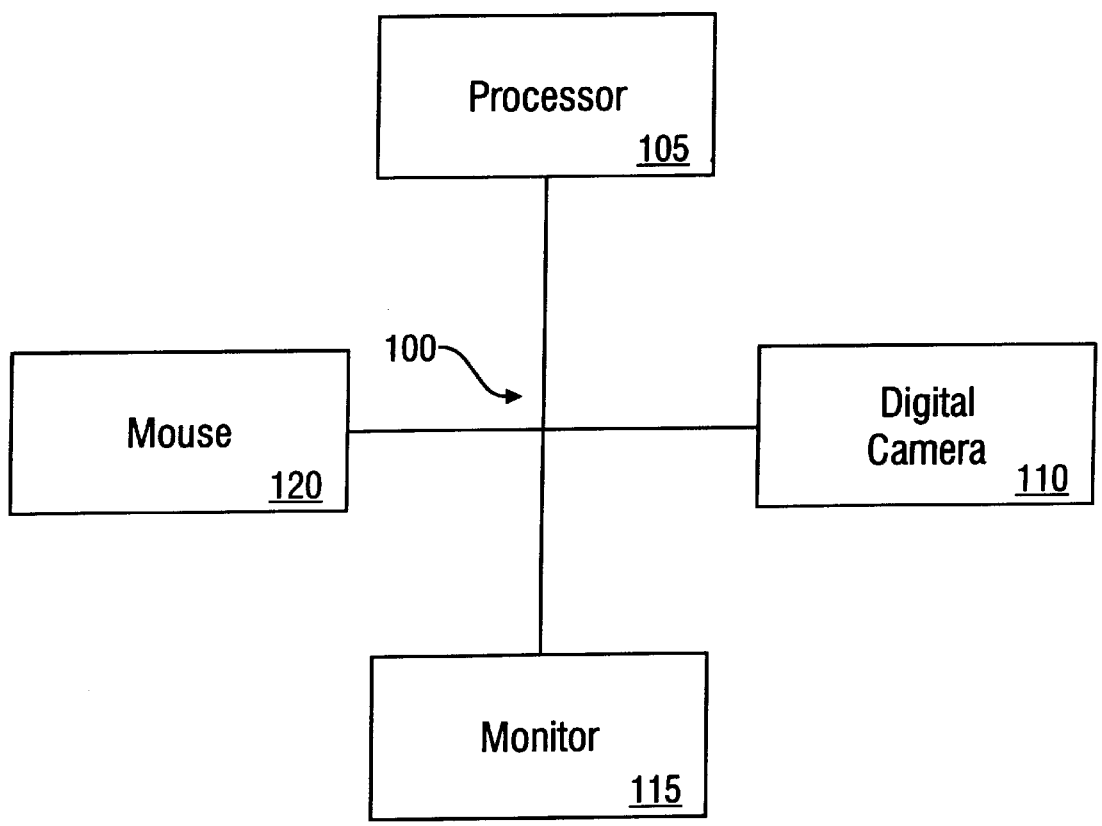
FIG. 1 is a simplified illustration of devices connected to a bus.
Figure 2:
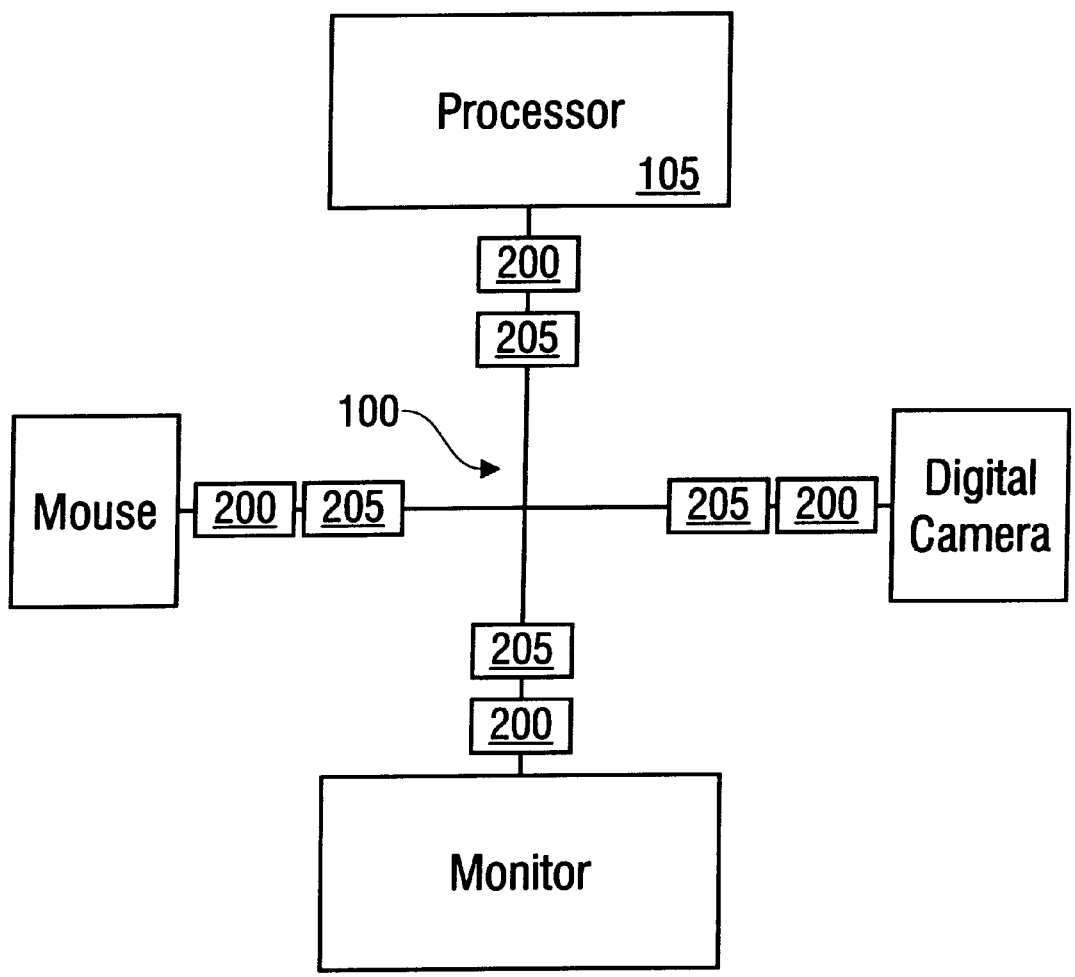
FIG. 2 is a more detailed view of FIG. 1.
Figure 3A:
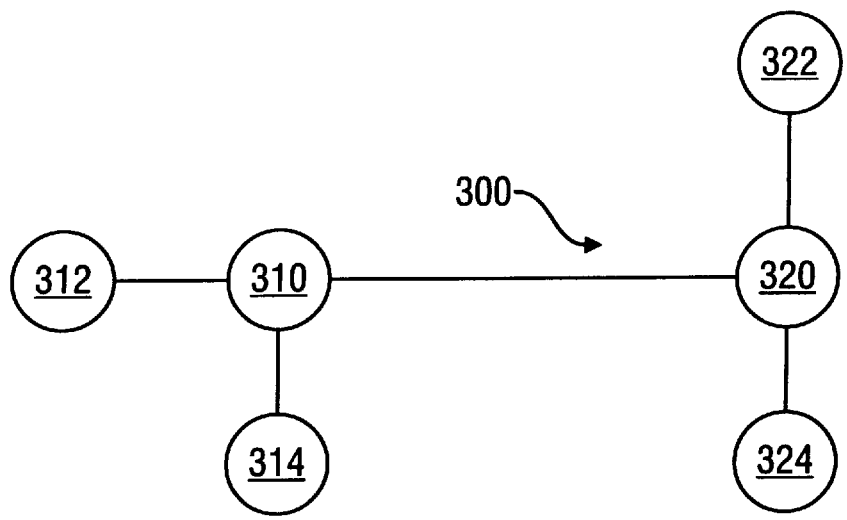
FIG. 3A illustrates six nodes connected to a bus.
Figure 3B:
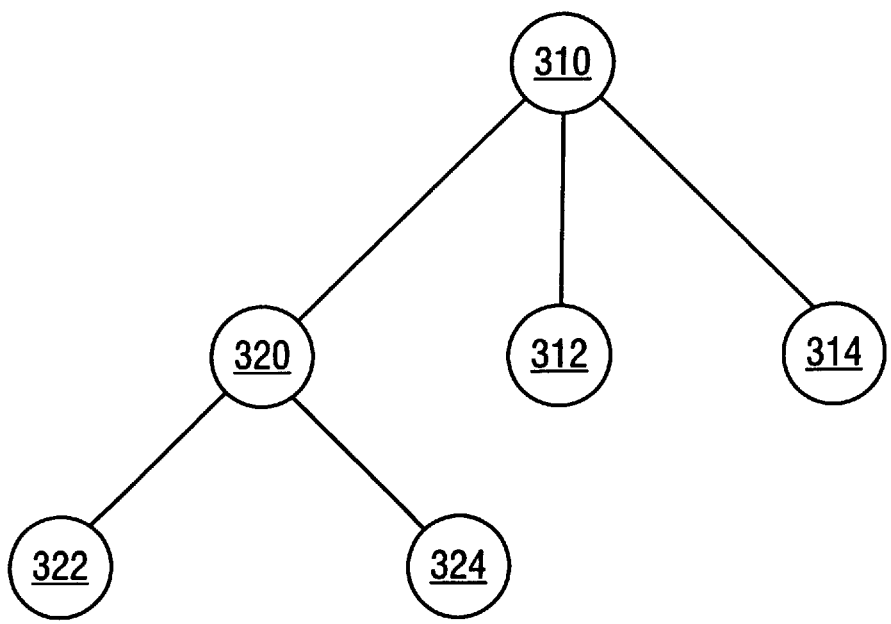
FIG. 3B illustrates the nodal tree for the nodes of FIG. 3A after a tree identification process has occurred.

While the invention is susceptible to various modifications and alternative forms, specific embodiments have been shown by way of example in the drawings and are described in detail. It should be understood, however, that the description herein of specific embodiments is not intended to limit the invention to the particular forms disclosed. On the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below as they might be employed in a method for hindering some nodes from becoming bus arbitration controller. In the interest of conciseness, not all features of an actual implementation are described in this specification. It will of course be appreciated that in the development of any actual embodiment, numerous implementation-specific decisions must be made to achieve the developer's specific goals, such as compliance with system-related and business-related constraints. Moreover, it will be appreciated that even if such a development effort might be complex and time-consuming, it would nevertheless be a routine undertaking for one of ordinary skill having the benefit of this disclosure.

Overview

Figure 4A:
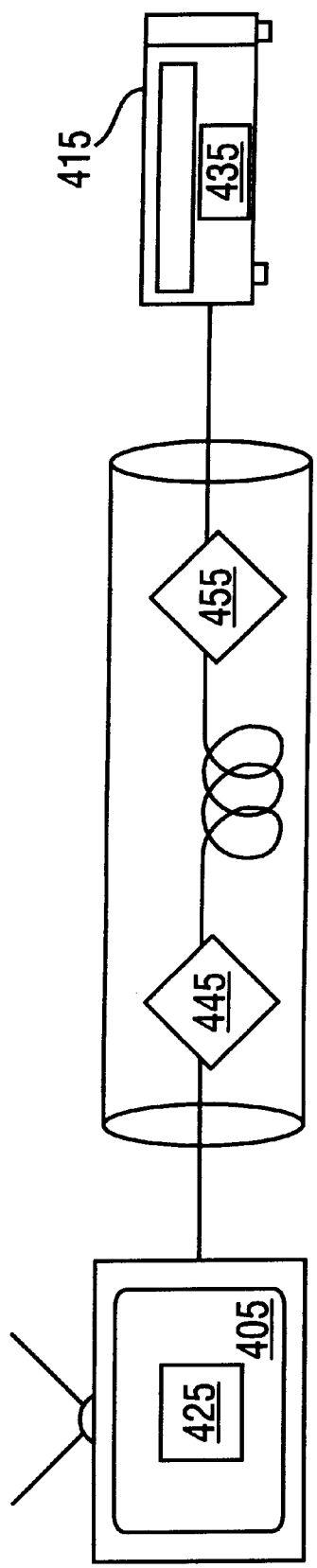
FIG. 4A is a simplified system in which the present invention can be used.
Figure 4B:
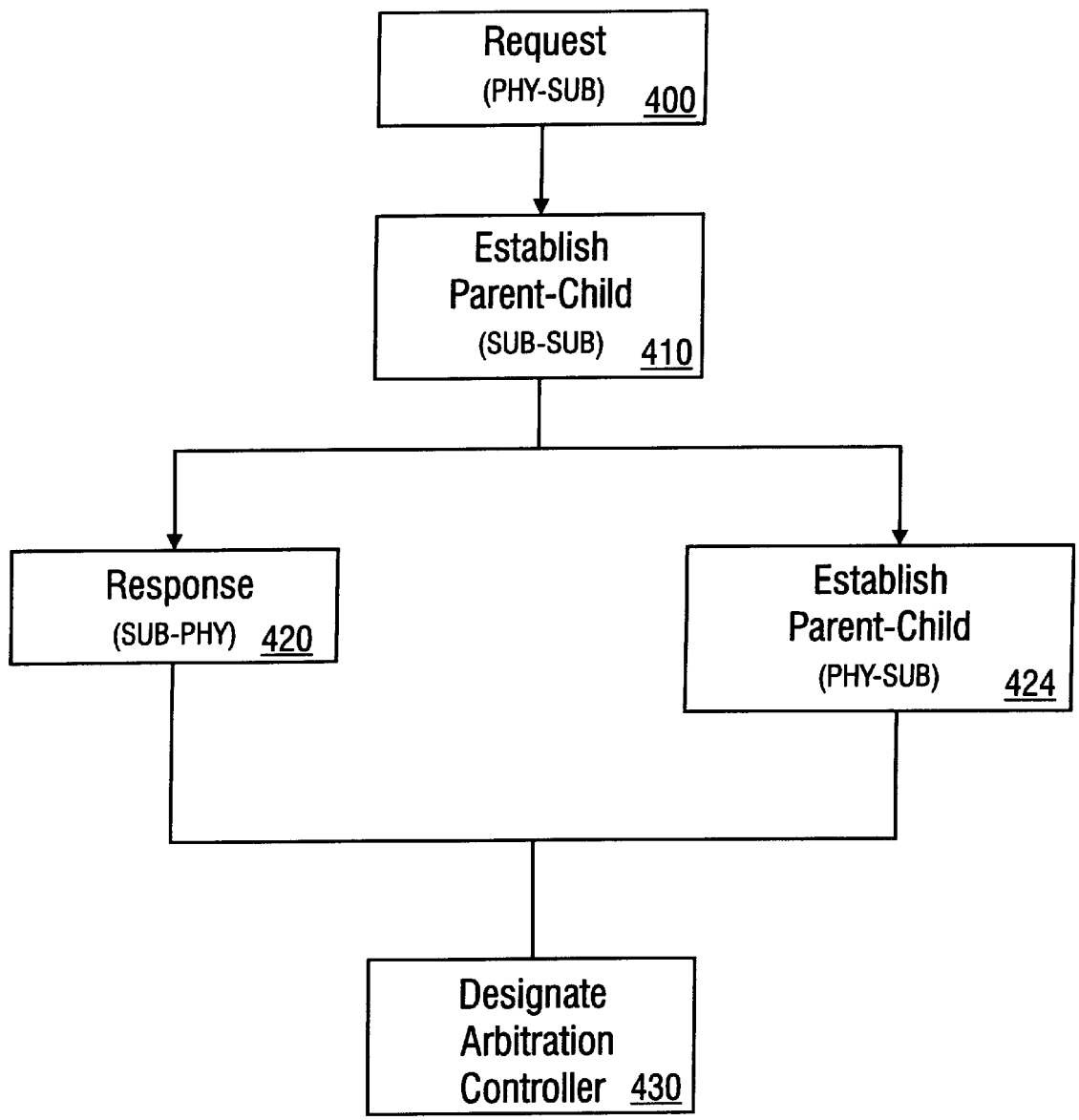
FIG. 4B is a simplified flow chart for a method according to the invention.

FIG. 4B illustrates a simplified flow chart for a method in accordance with the invention, while FIG. 4A shows one particular physical arrangement in which this method can be used. A television set (TV) 405 and the video cassette recorder (VCR) 415 may be any type of conventional device that has a 1394 bus connector. The details surrounding 1394 connectors relate to the IEEE standard 1394-1995 specification and supplements and have not been included so as not to obscure the present invention. One skilled in the art will appreciate that devices with is 1394 connectors are attached to a 1394 bus such that signals sent to the 1394 connector may be applied to the 1394 bus and routed to other devices.

The 1394 bus connectors for the TV 405 and the VCR 415 have been explicitly shown in FIG. 4A as the nodes 425, 435. The 1394 nodes 425, 435 are physical logic circuits that include logic circuitry needed for bus arbitration to enable them to become root nodes during the tree identification process. Associated with each 1394 node in FIG. 4A is a subphysical (sub) node 445, 455 that, as previously mentioned, has less logical circuitry than a "regular" physical node (phy), which helps to reduce cost. The subphysical nodes 445, 455 are connected to the physical nodes 425, 435, respectively. Because of the reduced circuitry within the subphysical nodes 445, 455, a method in accordance with the invention hinders these nodes from becoming the bus arbitration controller.

A simplified flow chart indicating the method in accordance with the invention for prohibiting the subphysical nodes 445, 455 from becoming the bus arbitration controller during the tree identification process is shown in FIG. 4B. At block 400 a request is sent from one of the physical nodes (e.g., 425 or 435) to one of the subphysical nodes (e.g., 445 or 455). The request sent at block 400 is generally a request to have a node agree to be the parent of the other node. As previously mentioned, being the parent of a node generally involves forwarding packets and arbitration signals to/from its child nodes.

If, at the block 400, the physical node 425 sends the request to the subphysical node 445, the subphysical node 445 would then seek to establish a parent-child relationship between itself and the subphysical node 455 at the block 410. If the subphysical node 455 agrees to be the parent of the subphysical node 445, two actions would occur essentially simultaneously. The subphysical node 455 would establish a relationship as child of the physical node 435 (see block 424), while the subphysical node 445 would send a response to the physical node 425 (see block 420) agreeing to be the parent of that node.

In this example, the physical node 435 would be designated as the root node (i.e., the bus arbitration controller) at the block 430 and have the subphysical node 455 as its child, while the subphysical node 455 would have the subphysical node 445 as its child. The subphysical node 445 would have the physical node 425 as its child. Thus, the method according to the invention whose steps are indicated in FIG. 4B have prevented the subphysical nodes 445, 455 from becoming the bus arbitration controller. One skilled in the art will appreciate that the present invention may be applied to a bus with more nodes and is only limited by the limitations of the IEEE Standard 1394-1995 specification and supplements.

A Specific Embodiment

Figure 5:
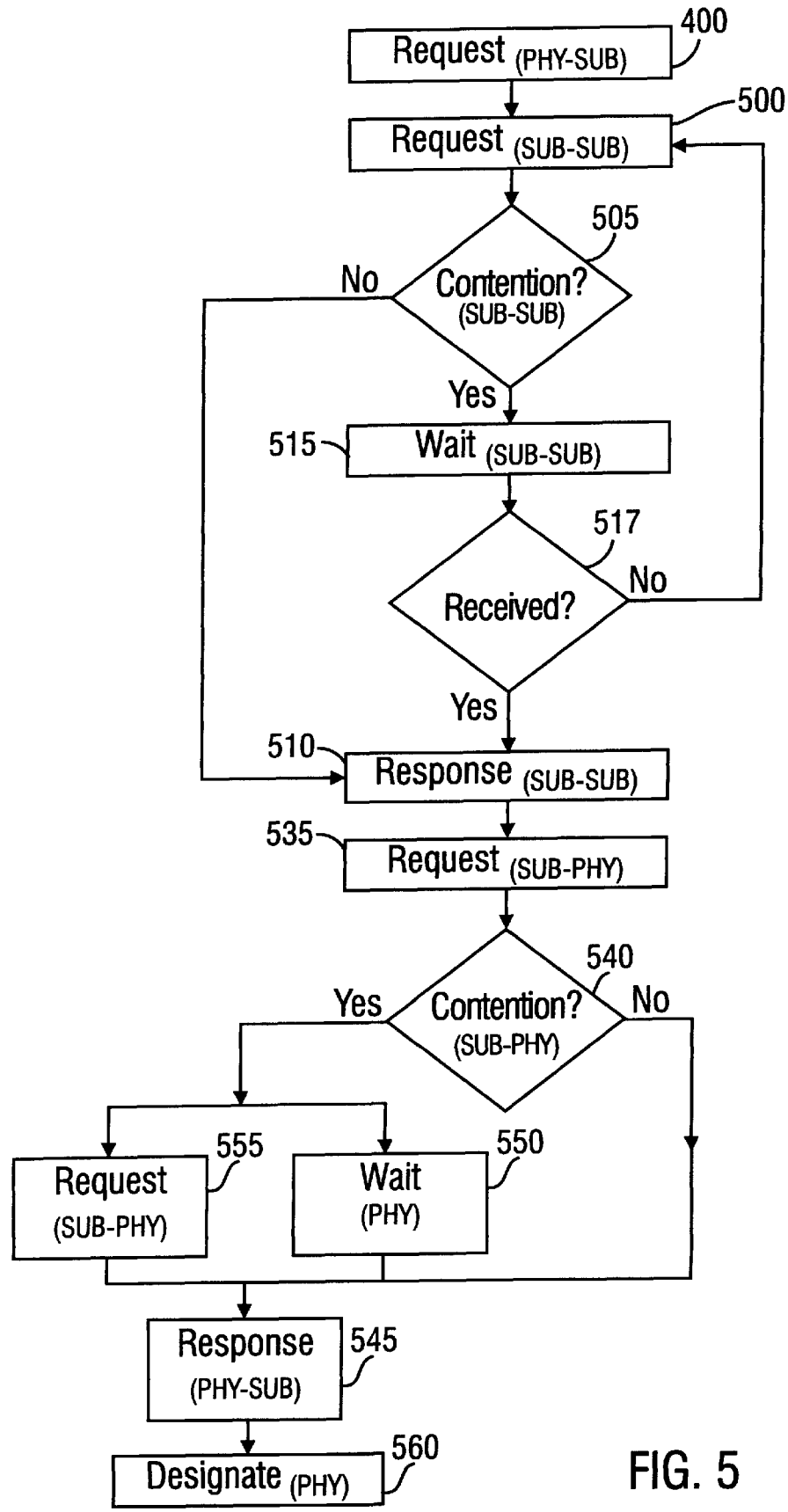
FIG. 5 is a detailed flow chart of an embodiment of a method according to the invention.

FIG. 5 is a more detailed view of a flow chart indicating individual procedures executed in a method to prevent a subphysical node from becoming a root node. As previously mentioned, at block 400, a request is sent from a physical node to a subphysical node. After the first request is sent, a second request is sent at block 500 from one subphysical node to the other subphysical node, which begins the process of establishing a parent-child relationship among the subphysical nodes, as previously discussed at block 410 of FIG. 4B. The term request, when used in this application, unless otherwise indicated, generally refers to the issuing of a parent-notify request in which the sending node is requesting the receiving node to be its parent.

After the second request has been sent at block 500, it is determined if contention is present at block 505. The term contention, as defined in this application, occurs if a request is sent from a first node to a second node, while the second node is sending a request to the first, such that the requests cross each other. As an example, contention would occur if the physical node 425 of FIG. 4A is sending a request to the subphysical node 445, while the subphysical node 445 is sending a request to the physical node 425.

If there is no contention, a child-notify response is sent from one subphysical to the other s subphysical at block 510, which establishes a parent-child relationship among the subphysical nodes. If contention exists between the two subphysical nodes, each of the nodes randomly selects one of two numbers. The nodes then wait for a selected amount of time at block 515 corresponding to the number that was selected. For example, if one subphysical node selects a one, it may wait for 5 ns while the wait time for a zero may be only 3 ns. After waiting the selected amount of time, the subphysical nodes determine if a request has been received at block 517. If a parent-notify request has been received, a child-notify response is sent from one subphysical node to the other at block 510. Alternatively, contention may be resolved numerous other ways including a manufacturing option that could designate one node to be the parent whenever contention exists.

If a request has not been received, it is resent from the subphysical node to the other subphysical node at block 500. It must be determined again whether or not contention exists at block 505. One skilled in the art will appreciate that if the subphysical nodes pick different numbers, then one of the nodes will wait longer than the other node. In this case, the node that waits the longer of the two would not get the opportunity to send a parent-notify request because it would have already received the second request from the other subphysical node, in which case, no contention would exist, and the subphysical node who waited the longest would then send a response to the other subphysical node at block 510.

Contention will exist if both of the subphysical nodes randomly pick the same number, thereby waiting for the same amount of time at block 515. In this case, both of the subphysical nodes randomly pick numbers again and wait for a second time at block 515. After waiting for a selected time, parent-notify requests are resent if no request was received, and if contention exists, this sequence is repeated again. One skilled in the art will realize that the random selection of numbers will eventually cause one subphysical node to wait longer than the other, such that a response can be sent at block 510.

As previously mentioned, when the response is sent at block 510, the parent-child relationship between the subphysical nodes is established. After the relationship has been established, a request may be sent from the parent subphysical node to its corresponding physical node at block 535. The sending of this request is used to help prevent the parent subphysical node from becoming the root node. Simultaneously, a child-notify response can be sent at block 545 from the child subphysical node to its corresponding physical node, indicating that it agrees to be the parent of that node since it now has a parent (i.e., the parent subphysical node).

After the request is generated at block 535, the system checks for contention between the parent subphysical node and its corresponding physical node again at block 540. If there is no contention, the physical node sends a child-notify response to the parent subphysical node, indicating that the physical node agrees to be the parent of the parent subphysical node at block 545. If there is contention, the physical node waits for a designated amount of time at block 550. While the physical node is waiting, the subphysical node continues to send the parent-notify request to the physical node at block 555. Since the physical node is waiting, it receives the parent-notify request from the parent subphysical node and responds by sending a child-notify response back to the subphysical node at block 545.

Figure 6:
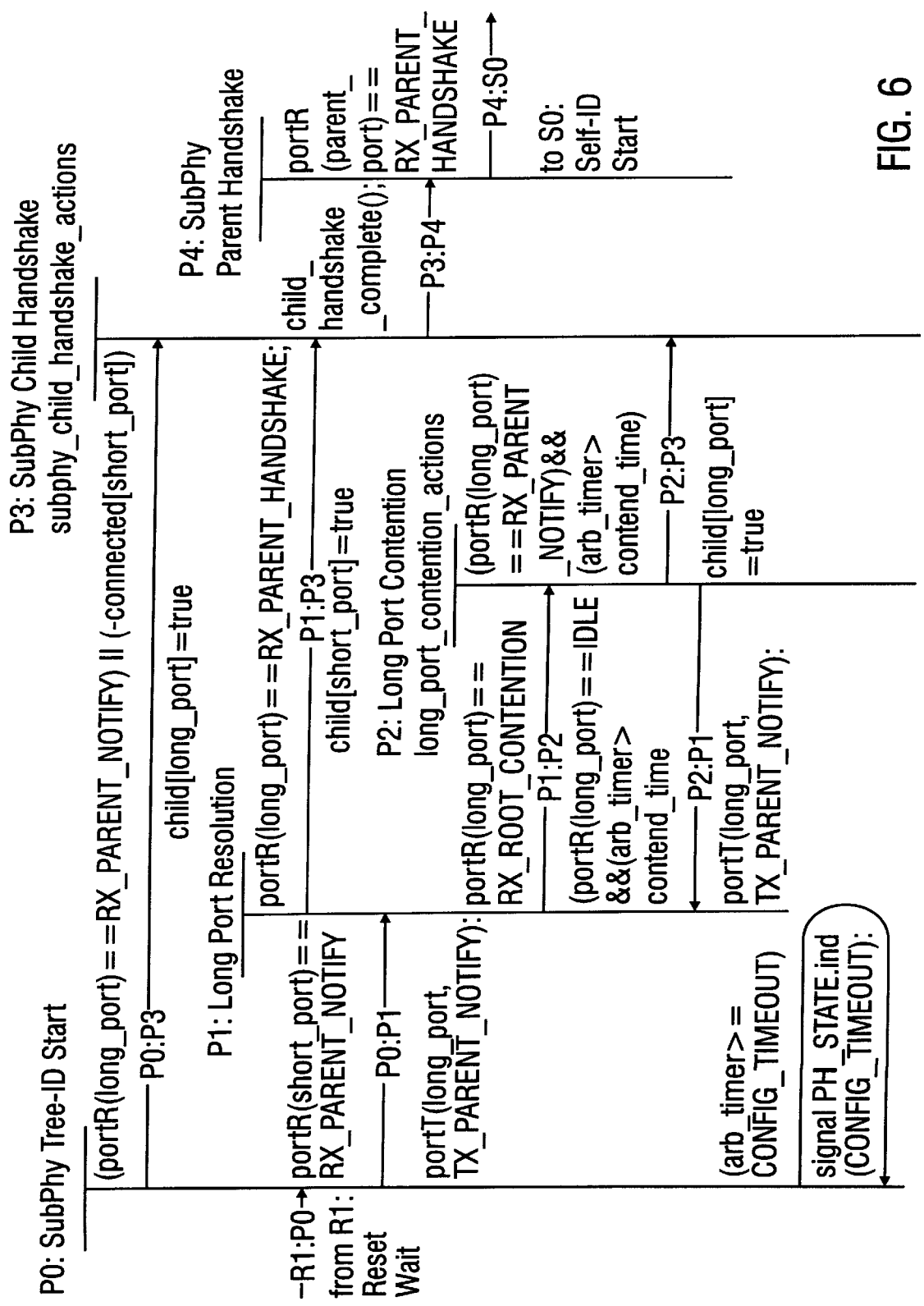
FIG. 6 is a state machine for the invention of FIG. 5.

After the child-notify response is sent from the physical node to the parent subphysical node at block 545, that physical node is then designated as the root node at block 560. As previously mentioned, the designation of the physical node as the root node essentially means that the physical node will control the arbitration of the bus. Though the method shown in FIG. 5 involved only two subphysical nodes, it could also be used when there are more than two subphysical nodes. One skilled in the art will appreciate that, though FIG. 5 and FIG. 6 are used for two port devices, the present invention may be implemented in devices with more than two ports.

A method for preventing subphysical nodes from becoming the bus arbitration controller in accordance with the invention offers several advantages over contemporary bus protocols. The use of subphysical nodes has permitted a reduction in the amount of circuitry required for the node. The circuitry reduction causes a corresponding decrease in the cost of the bus. Use of subphysical nodes as bus arbitration controllers is difficult because of their reduced amount of circuitry. Thus, the present method presents a way to essentially insure that the subphysical nodes do not become the root node. One skilled in the art will appreciate that the method of FIG. 5 is embodied in the state machine of FIG. 6. This state machine may be converted to a source code (e.g., Verilog or VHDL) which then may be manipulated by a silicon design compiler (e.g., Design Analyzer by Synopsys) that could design the logic circuit needed to implement the method in accordance with this invention.

It will be appreciated by those of ordinary skill in the art having the benefit of this disclosure that numerous variations from the foregoing illustration will be possible without departing from the inventive concept described herein. Accordingly, it is the claims set forth below, and not merely the foregoing illustration, which are intended to define the exclusive rights of the invention.

What is claimed is:

1. A method for hindering subphysical nodes from becoming a bus arbitration controller in favor of physical nodes during a tree identification process, said method comprising:

sending a first request from a first physical node to a second subphysical node;

establishing a parent-child relationship between a third subphysical node and said second subphysical node;

sending a first response establishing said second subphysical node as the child of said first physical node; and designating said first physical node as the bus arbitration controller;

wherein the subphysical nodes have less bus arbitration capabilities than the physical nodes such that the subphysical nodes cannot effectively function as a root node.

2. The method of claim 1, wherein the establishing of a parent-child relationship comprises:

sending parent-notify requests between said second and third subphysical nodes;

waiting a selected amount of time;

sending a parent-notify request from said third subphysical node to said second subphysical node; and sending a child-notify response from said second subphysical node to said first physical node.

3. The method of claim 1, wherein the establishing of a parent-child relationship comprises:

sending parent-notify requests between said second and third subphysical nodes;

waiting a first selected amount of time;

sending parent-notify requests between said second and third subphysical nodes;

waiting a second selected amount of time;

sending a parent-notify request from said third subphysical node to said second subphysical node; and sending a child-notify response from said second subphysical node to said third subphysical node.

4. The method of claim 1, wherein the designating of said first physical node as the bus arbitration controller includes causing said first physical node to control the passage of signals on a bus in a digital system.

5. The method of claim 1 wherein the sending of said first request is initiated by an action selected from the group of actions consisting of adding at least one device to a digital system, removing at least one external device from said digital system, and powering said digital system.

6. The method of claim 1, further comprising sending a second request from a fourth physical node to said third subphysical node when said first request is being sent.

7. The method of claim 1, wherein the establishing of a relationship is being completed by sending signals between two subphysical logic circuits.

8. The method of claim 1, wherein the establishing of a parent-child relationship results from sending simultaneous requests between said second and third subphysical nodes.

9. The method of claim 1, wherein the first physical node is only directly connected to the second subphysical node.

10. A method for hindering subphysical nodes from becoming a bus arbitration controller in favor of physical nodes when determining the arrangement of devices coupled to a serial bus, said method comprising:

sending a first request from a first physical node to a second subphysical node;

establishing a parent-child relationship between a third subphysical node and said second subphysical node;

causing said first physical node to be the child of said second subphysical node in response to the parent-child relationship between said second and third subphysical nodes. causing a fourth physical node to be the parent of said third subphysical node; and designating said fourth physical node as the bus arbitration controller;

wherein the subphysical nodes have less bus arbitration capabilities than the physical nodes such that the subphysical nodes cannot effectively function as a root node.

11. The method of claim 10, wherein the establishing of a parent-child relationship comprises:

sending parent-notify requests between said second and third subphysical nodes;

waiting a selected amount of time;

sending a parent-notify request from said second subphysical node to said third subphysical node; and sending a child-notify response from said third subphysical node to said second subphysical node.

12. The method of claim 10, wherein the establishing of a parent-child relationship comprises:

sending parent-notify requests between said second and third subphysical nodes;

waiting a first selected amount of time;

sending parent-notify requests between said second and third subphysical nodes;

waiting a second selected amount of time;

sending a parent-notify request from said second subphysical node to said third subphysical node; and sending a child-notify response from said third subphysical node to said second subphysical node.

13. The method of claim 10, wherein the causing of said fourth physical node to be the parent comprises:

sending a parent-notify request from said third subphysical node to said fourth physical node;

causing said fourth physical node to wait a selected amount of time while said third subphysical node continues to send said parent-notify request; and sending a child-notify response from said fourth physical node to said third subphysical node.

14. The method of claim 10, wherein the step of designating said fourth physical node as the bus arbitration controller comprises causing said fourth physical node to control the passage of signals on said bus.

15. The method of claim 10, wherein the sending of said first request is initiated by an action selected from the group of actions consisting of adding at least one device to said bus, removing at least one device from said bus, and powering a computer system.

16. The method of claim 10, further comprising sending a second parent request from said fourth physical node to said third subphysical node when said first request is being sent.

17. The method of claim 10, wherein the establishing of a relationship is being completed by sending signals between two subphysical logic circuits.

18. The method of claim 10, wherein the fourth physical node is only directly connected to the third subphysical node.

19. The method of claim 18, wherein the first physical node is only directly connected to the second subphysical node.

20. The method of claim 19, wherein the second subphysical node is directly connected only to the first physical node and the third subphysical node; and the third subphysical node is directly connected only to the fourth physical node and the second subphysical node.

21. A method for hindering subphysical nodes from becoming a bus arbitration controller in favor of physical nodes when determining the arrangement of devices coupled to a serial bus, said method comprising:

sending a first parent-notify request from a first physical node to a first subphysical node;

sending a second parent-notify request from said first subphysical node to a second subphysical node;

sending a first child-notify response from said second subphysical node to said first subphysical node;

sending a third parent-notify request from said second subphysical node to a second physical node;

waiting a selected amount of time;

sending a second child-notify response from said second physical node to said second subphysical node; and designating said second physical node as the bus arbitration controller;

wherein the subphysical nodes have less bus arbitration capabilities than the physical nodes such that the subphysical nodes cannot effectively function as a root node.

22. The method of claim 21, wherein the second physical node is only directly connected to the second subphysical node.

23. The method of claim 22, wherein the first physical node is only directly connected to the first subphysical node; the first subphysical node is directly connected only to the first physical node and the second subphysical node; and the second subphysical node is directly connected only to the second physical node and the first subphysical node.

24. A method for hindering subphysical nodes from becoming a bus arbitration controller in favor of physical nodes when determining the arrangement of devices coupled to a serial bus, said method comprising:

sending first and second parent-notify requests from first and second physical nodes to first and second subphysical nodes;

sending third and fourth parent-notify requests between said first and second subphysical nodes in response to said first and second parent-notify requests;

waiting a first selected amount of time;

sending a fifth parent-notify request from said first subphysical node to said second subphysical node;

sending a first child-notify response from said second subphysical node to said first subphysical node;

sending a second child-notify response from said first subphysical node to said first physical node;

sending a sixth parent-notify request from said second subphysical node to said second physical node;

causing said second physical node to wait a second selected amount of time while said second subphysical node continues to send said sixth parent-notify request;

sending a third child-notify request from said second physical node to said second subphysical node; and designating said second physical node as the bus arbitration controller;

wherein the subphysical nodes have less bus arbitration capabilities than the physical nodes such that the subphysical nodes cannot effectively function as a root node.

25. The method of claim 24, wherein the second physical node is only directly connected to the second subphysical node.

26. A program storage device readable by a machine tangibly embodying a program of instructions executable by the machine to perform method steps for hindering subphysical nodes from becoming a bus arbitration controller in favor of physical nodes when determining the arrangement of devices coupled to a serial bus, said method steps comprising:

sending a first request from a first physical node to a second subphysical node;

establishing a parent-child relationship between a subphysical third node and said second subphysical node;

sending a first response establishing said second subphysical node as the child of said first physical node; and designating said first physical node as the bus arbitration controller;

wherein the subphysical nodes have less bus arbitration capabilities than the physical nodes such that the subphysical nodes cannot effectively function as a root node.

27. The method of claim 26, wherein the first physical node is only directly connected to the second subphysical node.

28. A microprocessor programmed to perform a method for hindering subphysical nodes from becoming an arbitration controller in favor of physical nodes during a tree identification process, said method comprising:

sending a first request from a first physical node to a second subphysical node;

establishing a parent-child relationship between a third subphysical node and said second subphysical node;

sending a first response establishing said second subphysical node as the child of said first physical node; and designating said first physical node as the bus arbitration controller;

wherein the subphysical nodes have less bus arbitration capabilities than the physical nodes such that the subphysical nodes cannot effectively function as a root node.

29. The method of claim 28, wherein the first physical node is only directly connected to the second subphysical node.

30. A system comprising: a bus; one or more physical nodes coupled to the bus; one or more subphysical nodes coupled to the bus, the one or more subphysical nodes consisting of less bus arbitration capabilities than the physical nodes such that the subphysical nodes cannot effectively function as a root node, the one or more subphysical nodes configured to employ a bus protocol that defers bus arbitration controller status to the one or more physical nodes, whereby in all bus configurations a selected one physical node of the one or more physical nodes is identified as bus arbitration controller.

31. A method comprising:

identifying a plurality of nodes connected to a bus;

preventing a subphysical node of the plurality of nodes from becoming the bus arbitration controller by sending a parent-notify request from the subphysical node to a physical node of the plurality of nodes to which the subphysical node is directly connected, the subphysical node having less bus arbitration capabilities than the physical node and therefore incapable of effectively functioning as the bus arbitration controller; and designating the physical node as the bus arbitration controller.

32. A machine readable medium containing instructions which, when executed by a general purpose machine perform method steps for hindering subphysical nodes from becoming a bus arbitration controller in favor of physical nodes when determining the arrangement of devices coupled to a serial bus, said method steps comprising identifying a plurality of nodes connected to a bus;

preventing a subphysical node of the plurality of nodes from becoming the bus arbitration controller by sending a parent-notify request from the subphysical node to a physical node of the plurality of nodes to which the subphysical node is directly connected, the subphysical node having less bus arbitration capabilities than the physical node and therefore incapable of effectively functioning as the bus arbitration controller; and designating the physical node as the bus arbitration controller.

* * * * *

UNITED STATES PATENT AND TRADEMARK OFFICE
CERTIFICATE OF CORRECTION

PATENT NO.    : 6,145,018
DATED         : November 7, 2000
INVENTOR(S)   : LaFollette et al.

It is certified that error appears in the above-identified patent and that said Letters Patent is hereby corrected as shown below:

<u>Column 4,</u>
Line 15, before "1394", delete "is".

<u>Column 5,</u>
Line 18, delete "others", insert -- other --.

Signed and Sealed this

Twentieth Day of August, 2002

Attest:

Attesting Officer

JAMES E. ROGAN
*Director of the United States Patent and Trademark Office*